United States Patent
Caronni et al.

(10) Patent No.: US 6,870,842 B1
(45) Date of Patent: Mar. 22, 2005

(54) USING MULTICASTING TO PROVIDE ETHERNET-LIKE COMMUNICATION BEHAVIOR TO SELECTED PEERS ON A NETWORK

(75) Inventors: Germano Caronni, Palo Alto, CA (US); Amit Gupta, Fremont, CA (US); Tom R. Markson, San Mateo, CA (US); Sandeep Kumar, Santa Clara, CA (US); Christoph L. Schuba, Mountain View, CA (US); Glenn C. Scott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/457,915

(22) Filed: Dec. 10, 1999

(51) Int. Cl.[7] .......................... H04L 12/28; H04L 12/56
(52) U.S. Cl. ..................... 370/390; 370/432; 709/231
(58) Field of Search ................................ 370/235, 312, 370/389, 390, 392, 432, 475; 709/231

(56) References Cited

U.S. PATENT DOCUMENTS

| | | | |
|---|---|---|---|
| 4,825,354 A | 4/1989 | Agrawal et al. | |
| 5,220,604 A | 6/1993 | Gasser et al. | |
| 5,331,637 A | 7/1994 | Francis et al. | |

(List continued on next page.)

FOREIGN PATENT DOCUMENTS

| | | |
|---|---|---|
| EP | 0 702 477 A2 | 3/1996 |
| EP | 0 813 327 A2 | 12/1997 |
| EP | 0 887 981 A2 | 12/1998 |
| WO | WO 89/08887 | 9/1989 |
| WO | WO 98/18269 | 10/1997 |
| WO | WO 97/48210 | 12/1997 |
| WO | WO 98/32301 | 1/1998 |
| WO | WO 98/57464 | 12/1998 |
| WO | WO 99/11019 | 3/1999 |
| WO | WO 99/38081 | 7/1999 |

OTHER PUBLICATIONS

IBM Technical Disclosure Bulletin, "Virtual Private Networks on Vendor Independent Networks", vol. 35, No. 4A, pp. 326–329, Sep. 1992.

V–One Corp., "V–One's Smartgate VPN", No. XP–000785261, Advertisement Data Communications, pp. A5–A6.

Wright, M., "Using Policies for Effective Network Management", International Journal of Network Management 9, No. XP–002116275, pp. 118–125, 1999.

(List continued on next page.)

*Primary Examiner*—Ajit Patel
*Assistant Examiner*—Chirag Shah
(74) *Attorney, Agent, or Firm*—Finnegan, Henderson, Farabow, Garrett & Dunner, L.L.P.

(57) ABSTRACT

Methods and systems consistent with the present invention provide a Supernet, a private network constructed out of components from a public-network infrastructure. Supernet nodes can be located on virtually any device in the public network (e.g., the Internet), and both their communication and utilization of resources occur in a secure manner. The Supernet also uses multicast communication to create Ethernet-like communication between its nodes. In using multicasting, each communication of each node on a channel in the private network is sent to a multicast address which sends it to all of the nodes on the channel. Sending a copy of every communication to all of the other nodes on the channel makes system tasks, like debugging, easy for the nodes on the channel. The multicasting provided by the private network is dynamic in that multicast addresses can be assigned for use by a channel and reclaimed so as to allow sharing of the multicast addresses.

17 Claims, 13 Drawing Sheets

U.S. PATENT DOCUMENTS

| | | | |
|---|---|---|---|
| 5,335,346 A | | 8/1994 | Fabbio |
| 5,519,833 A | | 5/1996 | Agranat et al. |
| 5,570,366 A | * | 10/1996 | Baker et al. ................ 370/312 |
| 5,572,528 A | | 11/1996 | Shuen |
| 5,623,601 A | | 4/1997 | Vu |
| 5,696,763 A | * | 12/1997 | Gang, Jr. .................... 370/390 |
| 5,732,137 A | | 3/1998 | Aziz ........................... 380/25 |
| 5,835,723 A | * | 11/1998 | Andrews et al. ............ 709/226 |
| 5,856,974 A | | 1/1999 | Gervais et al. ............. 370/392 |
| 5,884,024 A | | 3/1999 | Lim et al. ............. 395/187.01 |
| 5,931,947 A | | 8/1999 | Burns et al. |
| 5,933,420 A | * | 8/1999 | Jaszewski et al. .......... 370/329 |
| 5,960,177 A | | 9/1999 | Tanno |
| 5,987,506 A | | 11/1999 | Carter et al. |
| 5,999,531 A | * | 12/1999 | Ferolito et al. ............. 370/390 |
| 6,061,346 A | | 5/2000 | Nordman |
| 6,061,796 A | | 5/2000 | Chen et al. |
| 6,078,586 A | | 6/2000 | Dugan et al. ................ 370/395 |
| 6,128,298 A | | 10/2000 | Wootton et al. ............ 370/392 |
| 6,130,892 A | | 10/2000 | Short et al. ................. 370/401 |
| 6,158,011 A | | 12/2000 | Chen et al. |
| 6,219,694 B1 | | 4/2001 | Lazaridis et al. |
| 6,226,751 B1 | | 5/2001 | Arrow et al. |
| 6,236,652 B1 | | 5/2001 | Preston et al. .............. 370/349 |
| 6,279,029 B1 | * | 8/2001 | Sampat et al. .............. 709/203 |
| 6,307,837 B1 | | 10/2001 | Ichikawa et al. ........... 370/230 |
| 6,308,282 B1 | * | 10/2001 | Huang et al. .................. 714/4 |
| 6,327,252 B1 | | 12/2001 | Silton et al. ................ 370/256 |
| 6,330,671 B1 | | 12/2001 | Aziz ........................... 713/163 |
| 6,333,918 B1 | | 12/2001 | Hummel ..................... 370/328 |
| 6,335,926 B1 | | 1/2002 | Silton et al. ................ 370/351 |
| 6,374,298 B2 | | 4/2002 | Tanno |
| 6,377,997 B1 | * | 4/2002 | Hayden ....................... 709/231 |
| 6,393,484 B1 | | 5/2002 | Massarani ................... 709/227 |
| 6,415,323 B1 | | 7/2002 | McCanne et al. ........... 709/225 |
| 6,452,925 B1 | | 9/2002 | Sistanizadeh et al. |
| 6,487,600 B1 | | 11/2002 | Lynch |
| 6,505,255 B1 | | 1/2003 | Akatsu et al. |
| 6,507,908 B1 | | 1/2003 | Caronni |
| 6,515,974 B1 | | 2/2003 | Inoue et al. |
| 6,557,037 B1 | | 4/2003 | Provino |
| 6,567,405 B1 | | 5/2003 | Borella et al. |
| 6,615,349 B1 | | 9/2003 | Hair |

OTHER PUBLICATIONS

Pakstas, A., "Towards Electronic Commerce Via Science Park Multi–Extranets", Computer Communications 22, pp. 1351–1363, 1999.

Forman, George H., et al., "The Challenges of Mobile Computing ", Mar. 9, 1994, University of Washington Computer Science & Engineering, 16 pages.

Aziz, Ashar, "Design and Implementation of SKIP", presented at the INET 1995 Hawaii Conference, Jun. 28, 1995, under the title Simple Key Management for Internet Protocols (SKIP).

Perkins, C., "IP Mobility Support", Website: *ftp://ftp.isi,edu/in–notes/rfc2002.txt*, IBM Abstract, Oct. 1996, pp. 1–79.

Perkins, Charles E., "Mobile IP", IEEE Communications Magazine, May 1997, pp. 1–78.

Perkins C., "Mobile Networking Through Mobile IP", IEEE Internet Computing, IEEE Service Center, Picataway, New Jersey, vol. 2, No. 1, 1998, pp. 1–12.

LaBorde, D., "Understanding And Implementing Effective VPNs", Computer Technology Review, Westworld Production Company, Los Angeles, California, vol. 18, No. 2, Feb. 1, 1988, pp. 12, 14, 16.

Freier, A. et al., "The SSL Protocol, Version 3.0", Internet draft, Nov. 18, 1996, pp. 1–72 including Abstract.

Deng, R., "Integrating Security in COBRA Based Objects Architectures", Institute of Systems Science, National University of Singapore Singapore 0511, Publication Date May 8, 1995, pp. 50–61.

Armitage, G., "IP Multicasting Over ATM Networks", IEEE Journal On Seleceted Areas in Communications, vol. 15, No. 3, Apr. 1997, pp. 445–457.

de Lima, Heliomar Medeiros et al., "An Effective Selective Repeat ARQ Strategy for High Speed Point–to–Multipoint Communications", IEEE, Publication Nov. 18, 1996, pp. 1059–1063.

Stevenson, D. et al., "Design of a Key Agile Cryptographic System for OC–12c Rate ATM", IEEE Journal on Selected Areas in Communication, 1995, pp. 17–29.

Chapter 3 The Jini Model, article "The Five Key Concepts of Jini", XP–002178476, 9 pages.

"Introduction to OrbixOTM", IONA Technologies PLC , Jun. 1999, 15 pages.

"OrbixNames Programmer's and Administrator's Guide", IONA Technologies PLC, Jun. 1999, 17 pages.

"Orbix C++Administrators Guide" IONA TEchnologies PLC, Feb. 1999, 12 pages.

Chung, P. et al., DCOM and COBRA "Side by Side, Step by Step and Layer by Layer", C++ Report website http://www.sigs.com, Jan. 1998, pp. 19–29 and 40.

"DCOM Technical Overview", Microsoft Corporation, Nov. 1996, 24 pages.

Fumio Teraoka , "VIP: a Protocol Providing Host Migration Transparency," Internetworking: Research and Experience, vol. 4, pp. 195–221 (1993).

Fumio Teraoka et al., "Host Migration Transparency inIP Networks: The VIP Approach ," Computer Communication Review, pp. 45–65.

Fumio Teraoka et al., "A Network Architecture Providing Host Migration Transparency," *Computer Communication Review*, No. 4, pp. 209–220, (Sep. 1991).

Xinhua Zhao et al., "Flexible Network Support for Mobility," ACM, pp. 145–155, (1998).

K.C. Chua et al., "On a Linux implementation of mobile IP and its effects on TCP performance," *Computer Communications Review*, No. 22, pp. 568–588, (1999).

* cited by examiner

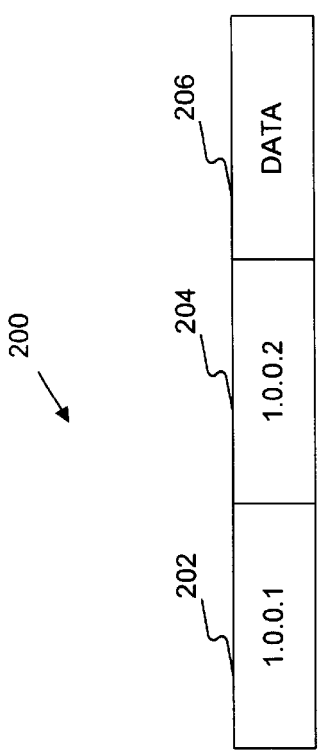
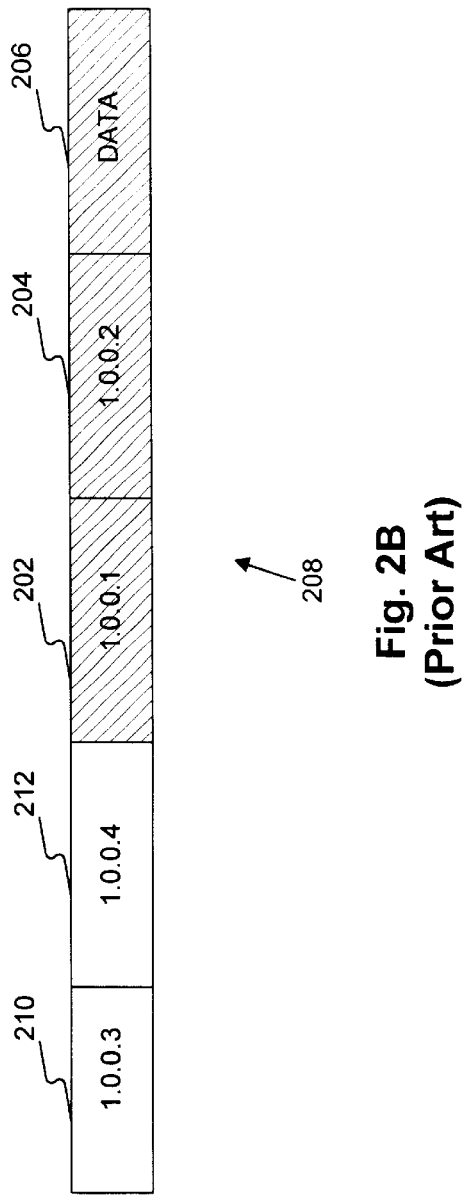
Fig. 2A
(Prior Art)
Fig. 2B
(Prior Art)

USING MULTICASTING TO PROVIDE ETHERNET-LIKE COMMUNICATION BEHAVIOR TO SELECTED PEERS ON A NETWORK

RELATED APPLICATIONS

The following identified U.S. patent applications are relied upon and are incorporated by reference in this application.

U.S. patent application Ser. No. 09/458,043, entitled "SYSTEM AND METHOD FOR SEPARATING ADDRESSES FROM THE DELIVERY SCHEME IN A VIRTUAL PRIVATE NETWORK," and filed on the same date herewith.

U.S. patent application Ser. No. 09/457,917, entitled "TRULY ANONYMOUS COMMUNICATIONS USING SUPERNETS WITH THE PROVISION OF TOPOLOGY HIDING," and filed on the same date herewith.

U.S. patent application Ser. No. 09/457,889, entitled "METHOD AND SYSTEM FOR FACILITATING RELOCATION OF DEVICES ON A NETWORK," and filed on the same date herewith.

U.S. patent application Ser. No. 09/457,916, entitled "SANDBOXING APPLICATIONS IN A PRIVATE NETWORK USING A PUBLIC-NETWORK INFRASTRUCTURE," and filed on the same date herewith.

U.S. patent application Ser. No. 09/457,894, entitled "SECURE ADDRESS RESOLUTION FOR A PRIVATE NETWORK USING A PUBLIC NETWORK INFRASTRUCTURE," and filed on the same date herewith.

U.S. patent application Ser. No. 09/458,020, entitled "DECOUPLING ACCESS CONTROL FROM KEY MANAGEMENT IN A NETWORK," and filed on the same date herewith.

U.S. patent application Ser. No. 09/457,895, entitled "CHANNEL-SPECIFIC FILE SYSTEM VIEWS IN A PRIVATE NETWORK USING A PUBLIC NETWORK INFRASTRUCTURE," and filed on the same date herewith.

U.S. patent application Ser. No. 09/458,020, entitled "PRIVATE NETWORK USING A PUBLIC-NETWORK INFRASTRUCTURE," and filed on the same date herewith.

U.S. patent application Ser. No. 09/457,914, entitled "SYSTEM AND METHOD FOR ENABLING SCALABLE SECURITY IN A VIRTUAL PRIVATE NETWORK," and filed on the same date herewith.

U.S. patent application Ser. No. 09/457,896, entitled "ANYCASTING IN A PRIVATE NETWORK USING A PUBLIC NETWORK INFRASTRUCTURE," and filed on the same date herewith.

U.S. patent application Ser. No. 09/458,021, entitled "SCALABLE SECURITY ASSOCIATIONS FOR GROUPS FOR USE IN A PRIVATE NETWORK USING A PUBLIC-NETWORK INFRASTRUCTURE," and filed on the same date herewith.

U.S. patent application Ser. No. 09/458,044, entitled "ENABLING SIMULTANEOUS PROVISION OF INFRASTRUCTURE SERVICES," and filed on the same date herewith.

FIELD OF THE INVENTION

The present invention relates generally to data processing systems and, more particularly, to a private network using a public-network infrastructure.

BACKGROUND OF THE INVENTION

As part of their day-to-day business, many organizations require an enterprise network, a private network with lease lines, dedicated channels, and network connectivity devices, such as routers, switches, and bridges. These components, collectively known as the network's "infrastructure," are very expensive and require a staff of information technology personnel to maintain them. This maintenance requirement is burdensome on many organizations whose main business is not related to the data processing industry (e.g., a clothing manufacturer) because they are not well suited to handle such data processing needs.

Another drawback to enterprise networks is that they are geographically restrictive. The term "geographically restrictive" refers to the requirement that if a user is not physically located such that they can plug their device directly into the enterprise network, the user cannot typically utilize it. To alleviate the problem of geographic restrictiveness, virtual private networks have been developed.

In a virtual private network (VPN), a remote device or network connected to the Internet may connect to the enterprise network through a firewall. This allows the remote device to access resources on the enterprise network even though it may not be located near any component of the enterprise network. For example, FIG. 1 depicts a VPN 100, where enterprise network 102 is connected to the Internet 104 via firewall 106. By using VPN 100, a remote device $D_1$ 108 may communicate with enterprise network 102 via Internet 104 and firewall 106. Thus, $D_1$ 108 may be plugged into an Internet portal virtually anywhere within the world and make use of the resources on enterprise network 102.

To perform this functionality, $D_1$ 108 utilizes a technique known as tunneling to ensure that the communication between itself and enterprise network 102 is secure in that it cannot be viewed by an interloper. "Tunneling" refers to encapsulating one packet inside another when packets are transferred between end points (e.g., $D_1$ 108 and VPN software 109 running on firewall 106). The packets may be encrypted at their origin and decrypted at their destination. For example, FIG. 2A depicts a packet 200 with a source Internet protocol (IP) address 202, a destination IP address 204, and data 206. It should be appreciated that packet 200 contains other information not depicted, such as the source and destination port. As shown in FIG. 2B, the tunneling technique forms a new packet 208 out of packet 200 by encrypting it and adding both a new source IP address 210 and a new destination IP address 212. In this manner, the contents of the original packet (i.e., 202, 204, and 206) are not visible to any entity other than the destination. Referring back to FIG. 1, by using tunneling, remote device $D_1$ 108 may communicate and utilize the resources of the enterprise network 102 in a secure manner.

Although VPNs alleviate the problem of geographic restrictiveness, they impose significant processing overhead when two remote devices communicate. For example, if remote device $D_1$ 108 wants to communicate with remote device $D_2$ 110, $D_1$ sends a packet using tunneling to VPN software 109, where the packet is decrypted and then transferred to the enterprise network 102. Then, the enterprise network 102 sends the packet to VPN software 109, where it is encrypted again and transferred to $D_2$. Given this processing overhead, it is burdensome for two remote devices to communicate in a VPN environment. It is therefore desirable to alleviate the need of organizations to maintain their own network infrastructure as well as to improve communication between remote devices.

SUMMARY OF THE INVENTION

Methods and systems consistent with the present invention provide a private network that uses components from a public-network infrastructure. Nodes of the private network can be located on virtually any device in the public network (e.g., the Internet), and both their communication and utilization of resources occur in a secure manner. As a result, the users of this private network benefit from their network infrastructure being maintained for them as part of the public-network infrastructure, while the level of security they receive is similar to or even stronger than that provided by conventional private networks. Additionally, the nodes of the private network are not geographically restricted in that they can be connected to the private network from virtually any portal to the Internet in the world.

This private network uses multicast communication to create Ethernet-like communication between its nodes. In using multicasting, each communication of each node on a channel in the private network is sent to a multicast address which sends it to all of the nodes on the channel. By sending a copy of every communication to all of the other nodes on the channel, the private network makes it appear as though the nodes are directly connected. This makes system tasks, like debugging, easy for the nodes of the private network. The multicasting provided by the private network is dynamic in that multicast addresses can be assigned for use by a channel and reclaimed so as to allow for the sharing of the multicast addresses. This dynamic use of multicast addresses allows the multicast addresses to be used efficiently.

In accordance with an implementation consistent with the present invention, a method is provided in a distributed system having a public network infrastructure. A private network with a plurality of nodes is established a over the public network infrastructure, and a multicast communication is sent to the nodes on the private network.

In another implementation, a device is connected to a distributed system comprising a private network with a plurality of nodes on devices, the private network using a public network infrastructure. A first of the devices has a memory that contains an address manager that assigns a multicast address with an expiration time to the plurality of nodes and that deassigns the multicast address such that the multicast address is rendered unavailable to the plurality of nodes when the expiration time expires. The first device also has a processor that runs the address manager. A second device has a memory with a sending node that requests from the address manager an address for a destination one of the plurality of nodes, that receives from the address manager the multicast address, and that sends a packet to the multicast address such that the plurality of nodes receives the packet. The second device also has a processor that runs the sending node.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2A depicts a conventional network packet;

FIG. 2B depicts the packet of FIG. 2A after it has been encrypted in accordance with a conventional tunneling technique;

DETAILED DESCRIPTION

Methods and systems consistent with the present invention provide a "Supernet," which is a private network that uses components from a public-network infrastructure. A Supernet allows an organization to utilize a public-network infrastructure for its enterprise network so that the organization no longer has to maintain a private network infrastructure; instead, the organization may have the infrastructure maintained for them by one or more service providers or other organizations that specialize in such connectivity matters. As such, the burden of maintaining an enterprise network is greatly reduced. Moreover, a Supernet is not geographically restrictive, so a user may plug their device into the Internet from virtually any portal in the world and still be able to use the resources of their private network in a secure and robust manner.

The Supernet uses multicast communication to create Ethernet-like communication between its nodes. In using multicasting, each communication of each node on a channel in the private network is sent to a multicast address which sends it to all of the nodes on the channel. By sending a copy of every communication to all of the other nodes on the channel, the private network makes it appear as though the nodes are directly connected. This makes system tasks, like debugging, easy for the nodes of the private network. The multicasting provided by the private network is dynamic in that multicast addresses can be assigned for use by a channel and reclaimed so as to allow for the sharing of the multicast addresses. This dynamic use of multicast addresses allows the multicast addresses to be used efficiently.

Overview

Figure 1:
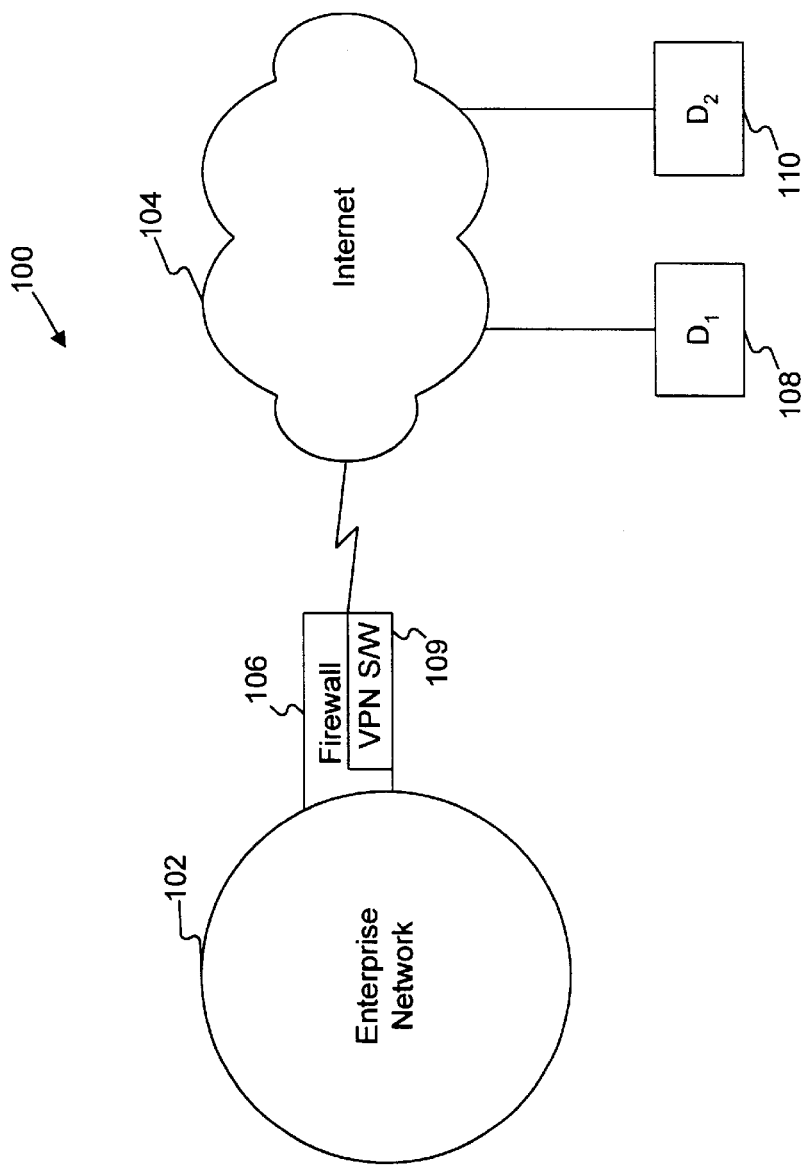
FIG. 1 depicts a conventional virtual private network (VPN) system.
Figure 3:
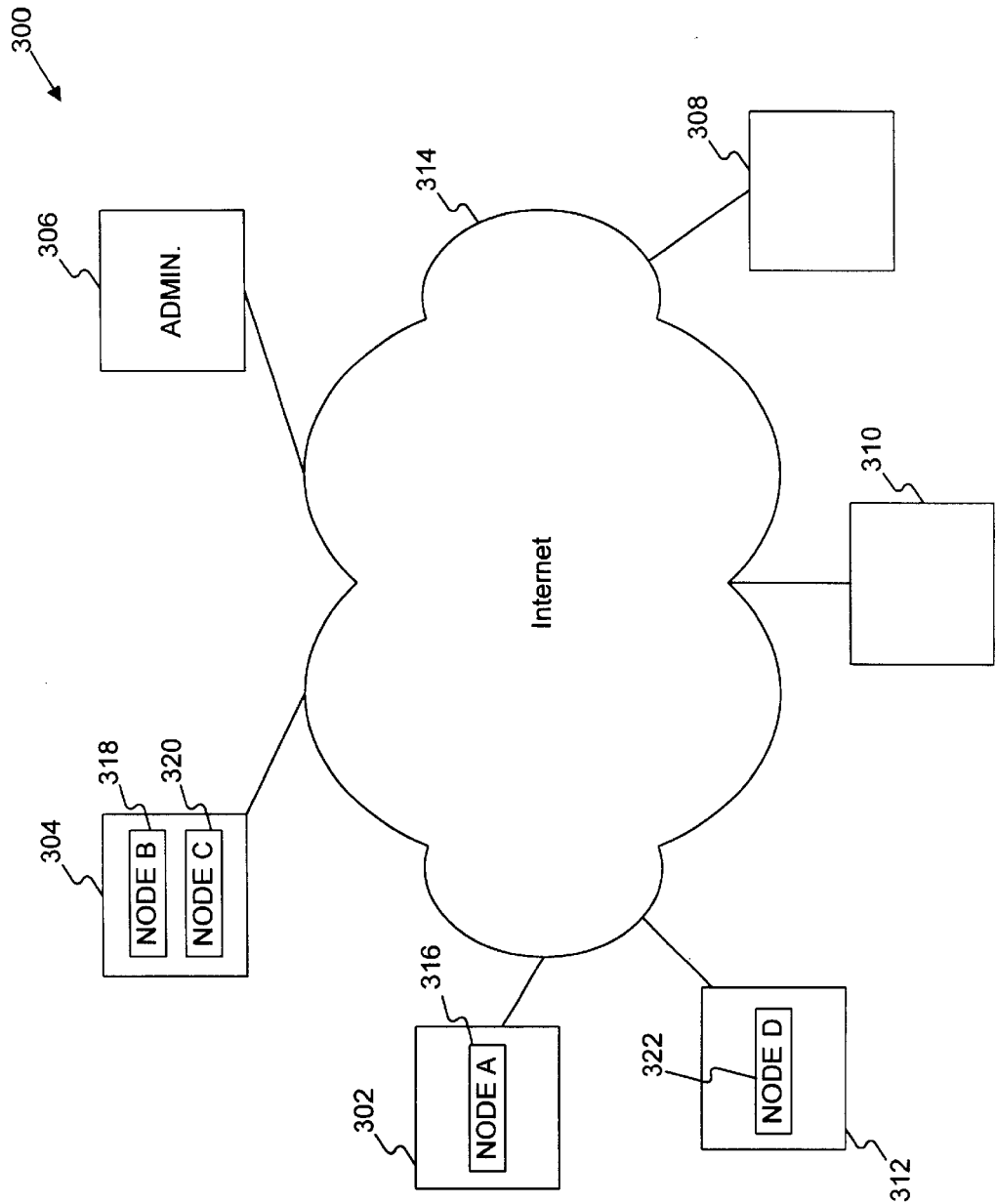
FIG. 3 depicts a data processing system suitable for use with methods and systems consistent with the present invention.

FIG. 3 depicts a data processing system 300 suitable for use with methods and systems consistent with the present invention. Data processing system 300 comprises a number of devices, such as computers 302–312, connected to a public network, such as the Internet 314. A Supernet's infrastructure uses components from the Internet because devices 302, 304, and 312 contain nodes that together form a Supernet and that communicate by using the infrastructure of the Internet. These nodes 316, 318, 320, and 322 are communicative entities (e.g., processes) running within a particular device and are able to communicate among themselves as well as access the resources of the Supernet in a secure manner. When communicating among themselves, the nodes 316, 318, 320, and 322 serve as end points for the communications, and no other processes or devices that are not part of the Supernet are able to communicate with the Supernet's nodes or utilize the Supernet's resources. The Supernet also includes an administrative node 306 to administer to the needs of the Supernet.

It should be noted that since the nodes of the Supernet rely on the Internet for connectivity, if the device on which a node is running relocates to another geographic location, the device can be plugged into an Internet portal and the node running on that device can quickly resume the use of the resources of the Supernet. It should also be noted that since a Supernet is layered on top of an existing network, it operates independently of the transport layer. Thus, the nodes of a Supernet may communicate over different transports, such as IP, IPX, X.25, or ATM, as well as different physical layers, such as RF communication, cellular communication, satellite links, or land-based links.

Figure 4:
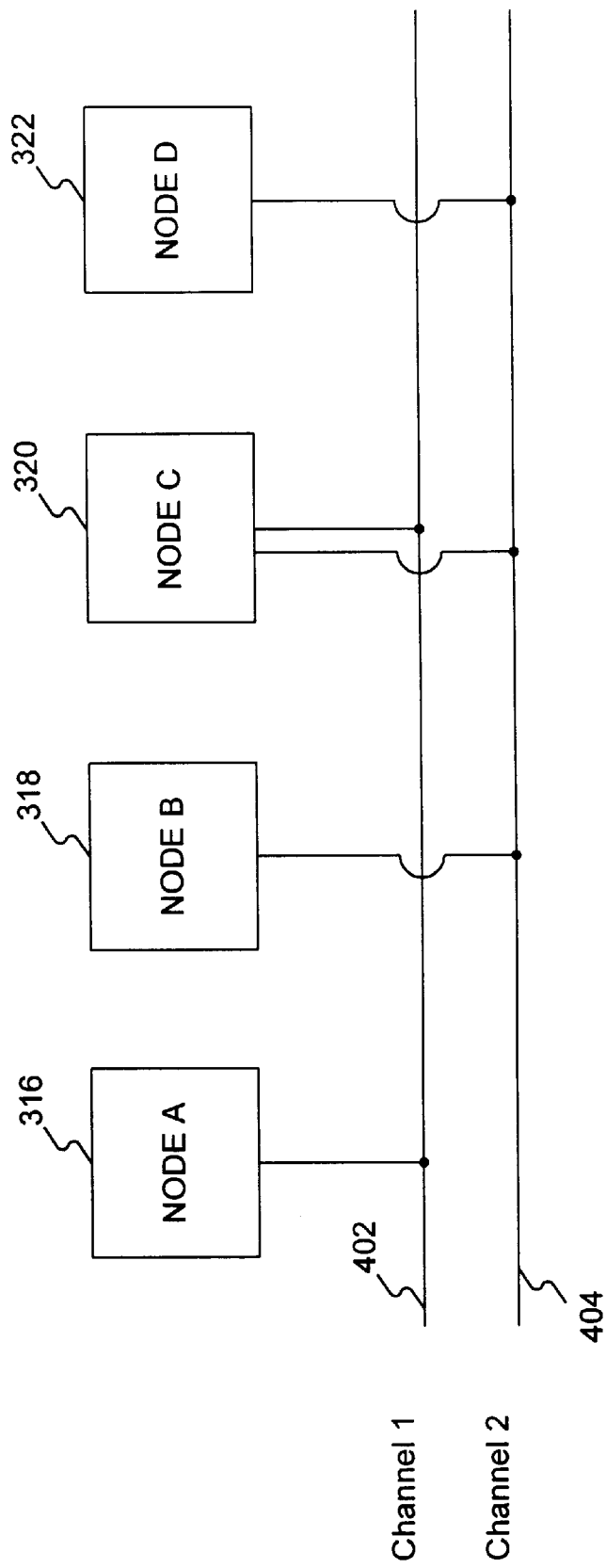
FIG. 4 depicts the nodes depicted in FIG. 3 communicating over multiple channels.

As shown in FIG. 4, a Supernet includes a number of channels that its nodes 316–322 can communicate over. A "channel" refers to a collection of virtual links through the public-network infrastructure that connect the nodes on the channel such that only these nodes can communicate over it. A node on a channel may send a message to another node on that channel, known as a unicast message, or it can send a message to all other nodes on that channel, known as a multicast message. For example, channel 1 402 connects node A 316 and node C 320, and channel 2 404 connects node B 318, node C 320, and node D 322. Each Supernet has any number of preconfigured channels over which the nodes on that channel can communicate. In an alternative embodiment, the channels are dynamically defined.

In addition to communication, the channels may be used to share resources. For example, channel 1 402 may be configured to share a file system as part of node C 320 such that node A 316 can utilize the file system of node C in a secure manner. In this case, node C 320 serves as a file system manager by receiving file system requests (e.g., open, close, read, write, etc.) and by satisfying the requests by manipulating a portion of the secondary storage on its local machine. To maintain security, node C 320 stores the data in an encrypted form so that it is unreadable by others. Such security is important because the secondary storage may not be under the control of the owners of the Supernet, but may instead be leased from a service provider. Additionally, channel 2 404 may be configured to share the computing resources of node D 322 such that nodes B 318 and C 320 send code to node D for execution. By using channels in this manner, resources on a public network can be shared in a secure manner.

A Supernet provides a number of features to ensure secure and robust communication among its nodes. First, the system provides authentication and admission control so that nodes become members of the Supernet under strict control to prevent unauthorized access. Second, the Supernet provides communication security services so that the sender of a message is authenticated and communication between end points occurs in a secure manner by using encryption. Third, the system provides key management to reduce the possibility of an intruder obtaining an encryption key and penetrating a secure communication session. The system does so by providing one key per channel and by changing the key for a channel whenever a node joins or leaves the channel. Alternatively, the system may use a different security policy.

Fourth, the system provides address translation in a transparent manner. Since the Supernet is a private network constructed from the infrastructure of another network, the Supernet has its own internal addressing scheme, separate from the addressing scheme of the underlying public network. Thus, when a packet from a Supernet node is sent to another Supernet node, it travels through the public network. To do so, the Supernet performs address translation from the internal addressing scheme to the public addressing scheme and vice versa. To reduce the complexity of Supernet nodes, system-level components of the Supernet perform this translation on behalf of the individual nodes so that it is transparent to the nodes. Another benefit of the Supernet's addressing is that it uses an IP-based internal addressing scheme so that preexisting programs require little modification to run within a Supernet.

Fifth, the Supernet provides operating system-level enforcement of node compartmentalization in that an operating system-level component treats a Supernet node running on a device differently than it treats other processes on that device. This component (i.e., a security layer in a protocol stack) recognizes that a Supernet node is part of a Supernet, and therefore, it enforces that all communications to and from this node travel through the security infrastructure of the Supernet such that this node can communicate with other members of the Supernet and that non-members of the Supernet cannot access this node. Additionally, this operating system-level enforcement of node compartmentalization allows more than one Supernet node to run on the same machine, regardless of whether the nodes are from the same Supernet, and allows nodes of other networks to run on the same machine as a Supernet node.

Finally, the Supernet provides Ethernet-like communication between nodes by using multicasting. Internet convention sets aside a range of Internet Protocol (IP) addresses that are designated as multicast addresses. In conventional networks, a user or group of users wishing to establish a multicast group obtain a multicast address from the Internet Assigned Numbers Authority (IANA). Each time a message is sent to this multicast address, the Internet routing tables direct a copy of the message to every user or node in the multicast group. The Supernet takes advantage of multicasting to make it appear as if the nodes are directly connected. This makes system tasks, like debugging, easy for members of the Supernet. Additionally, the multicast addresses can be dynamically assigned to channels and reclaimed when not in use.

Implementation Details

Figure 5:
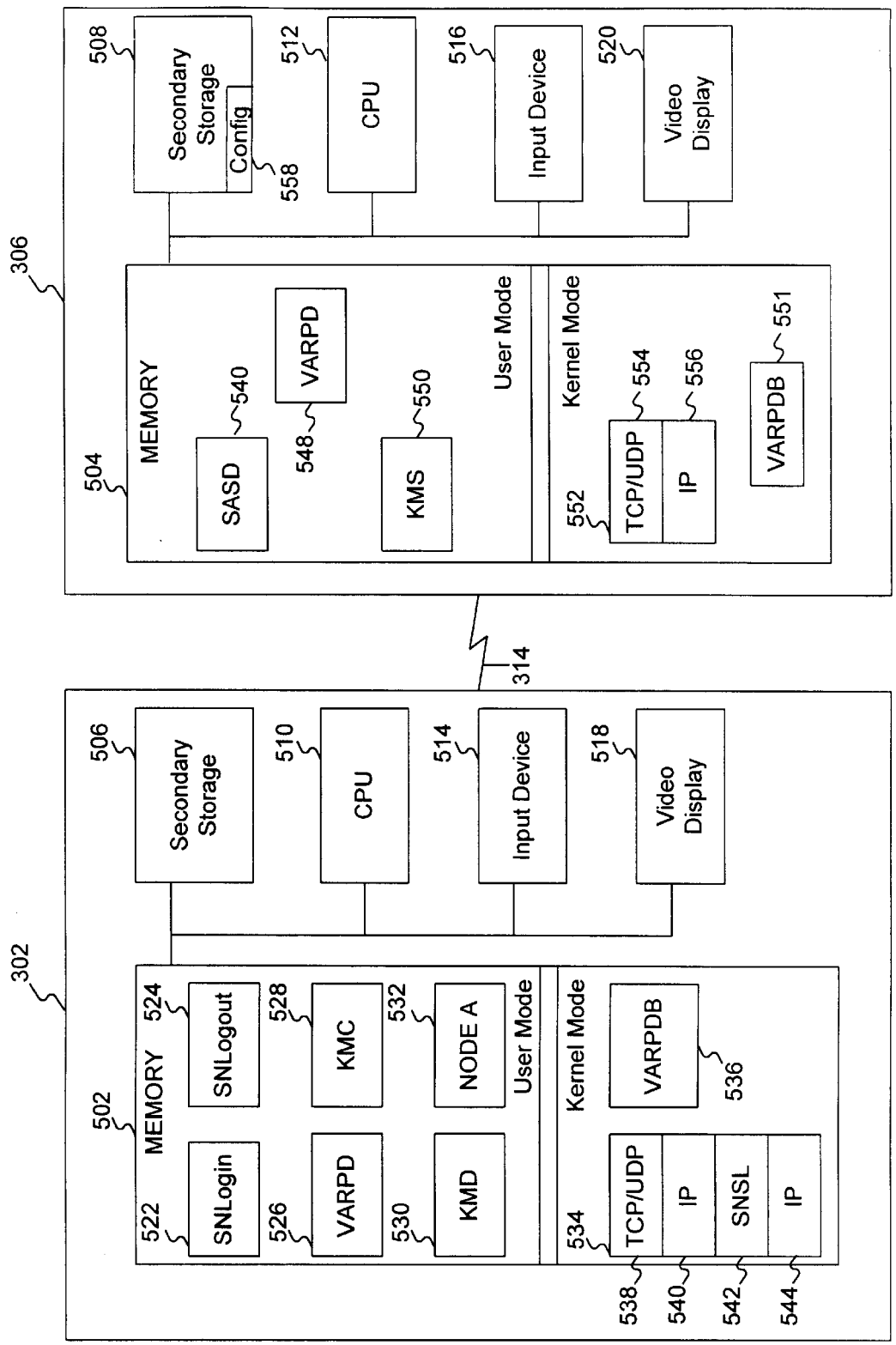
FIG. 5 depicts two devices depicted in FIG. 3 in greater detail.

FIG. 5 depicts administrative machine 306 and device 302 in greater detail, although the other devices 304 and 308–312 may contain similar components. Device 302 and administrative machine 306 communicate via Internet 314. Each device contains similar components, including a memory 502, 504; secondary storage 506, 508; a central processing unit (CPU) 510, 512; an input device 514, 516;

and a video display 518, 520. One skilled in the art will appreciate that these devices may contain additional or different components.

Memory 504 of administrative machine 306 includes the SASD process 540, VARPD 548, and KMS 550 all running in user mode. That is, CPU 512 is capable of running in at least two modes: user mode and kernel mode. When CPU 512 executes programs running in user mode, it prevents them from directly manipulating the hardware components, such as video display 518. On the other hand, when CPU 512 executes programs running in kernel mode, it allows them to manipulate the hardware components. Memory 504 also contains a VARPDB 551 and a TCP/IP protocol stack 552 that are executed by CPU 512 running in kernel mode. TCP/IP protocol stack 552 contains a TCP/UDP layer 554 and an IP layer 556, both of which are standard layers well known to those of ordinary skill in the art. Secondary storage 508 contains a configuration file 558 that stores various configuration-related information (described below) for use by SASD 540.

SASD 540 represents a Supernet: there is one instance of an SASD per Supernet, and it both authenticates nodes and authorizes nodes to join the Supernet. VARPD 548 has an associated component, VARPDB 551, into which it stores mappings of the internal Supernet addresses, known as a node IDs, to the network addresses recognized by the public-network infrastructure, known as the real addresses. The "node ID" may include the following: a Supernet ID (e.g., 0x 123), reflecting a unique identifier of the Supernet, and a virtual address, comprising an IP address (e.g., 10.0.0.1). The "real address" is an IP address (e.g., 10.0.0.2) that is globally unique and meaningful to the public-network infrastructure. In a Supernet, one VARPD runs on each machine, and it may play two roles. First, a VARPD may act as a server by storing all address mappings for a particular Supernet into its associated VARPDB. Second, regardless of its role as a server or not, each VARPD assists in address translation for the nodes on its machine. In this role, the VARPD stores into its associated VARPDB the address mappings for its nodes, and if it needs a mapping that it does not have, it will contact the VARPD that acts as the server for the given Supernet to obtain it.

KMS 550 performs key management by generating a new key every time a node joins a channel and by generating a new key every time a node leaves a channel. There is one KMS per channel in a Supernet.

To configure a Supernet, a system administrator creates a configuration file 558 that is used by SASD 540 when starting or reconfiguring a Supernet. This file may specify: (1) the Supernet name, (2) all of the channels in the Supernet, (3) the nodes that communicate over each channel, (4) the address of the KMS for each channel, (5) the address of the VARPD that acts as the server for the Supernet, (6) the user IDs of the users who are authorized to create Supernet nodes, (7) the authentication mechanism to use for each user of each channel, (8) the encryption algorithm to use for each channel, and (9) the multicast address associated with each channel. Although the configuration information is described as being stored in a configuration file, one skilled in the art will appreciate that this information may be retrieved from other sources, such as databases or interactive configurations.

After the configuration file is created, it is used to start a Supernet. For example, when starting a Supernet, the system administrator first starts SASD, which reads the configuration information stored in the configuration file. Then, the administrator starts the VARPD on the administrator's machine, indicating that it will act as the server for the Supernet and also starts the KMS process. After this processing has completed, the Supernet is ready for nodes to join it.

Memory 502 of device 302 contains SNlogin script 522, SNlogout script 524, VARPD 526, KMC 528, KMD 530, and node A 522, all running in user mode. Memory 502 also includes TCP/IP protocol stack 534 and VARPDB 536 running in kernel mode.

SNlogin 522 is a script used for logging into a Supernet. Successfully executing this script results in a Unix shell from which programs (e.g., node A 522) can be started to run within the Supernet context, such that address translation and security encapsulation is performed transparently for them and all they can typically access is other nodes on the Supernet. Alternatively, a parameter may be passed into SNlogin 522 that indicates a particular process to be automatically run in a Supernet context. Once a program is running in a Supernet context, all programs spawned by that program also run in the Supernet context, unless explicitly stated otherwise. SNlogout 524 is a script used for logging out of a Supernet. Although both SNlogin 522 and SNlogout 524 are described as being scripts, one skilled in the art will appreciate that their processing may be performed by another form of software. VARPD 526 performs address translation between node IDs and real addresses. KMC 528 is the key management component for each node that receives updates whenever the key for a channel ("the channel key") changes. There is one KMC per node per channel. KMD 530 receives requests from SNSL 542 of the TCP/IP protocol stack 534 when a packet is received and accesses the appropriate KMC for the destination node to retrieve the appropriate key to decrypt the packet. Node A 532 is a Supernet node running in a Supernet context.

TCP/IP protocol stack 534 contains a standard TCP/UDP layer 538, two standard IP layers (an inner IP layer 540 and an outer IP layer 544), and a Supernet security layer (SNSL) 542, acting as the conduit for all Supernet communications. To conserve memory, both inner IP layer 540 and outer IP layer 544 may share the same instance of the code of an IP layer. SNSL 542 performs security functionality as well as address translation. It also caches the most recently used channel keys for ten seconds. Thus, when a channel key is needed, SNSL 542 checks its cache first, and if it is not found, it requests KMD 530 to contact the appropriate KMC to retrieve the appropriate channel key. Two IP layers 540, 544 are used in the TCP/IP protocol stack 534 because both the internal addressing scheme and the external addressing scheme are IP-based. Thus, for example, when a packet is sent, inner IP layer 540 receives the packet from TCP/UDP layer 538 and processes the packet with its node ID address before passing it to the SNSL layer 542, which encrypts it, prepends the real source IP address and the real destination IP address, and then passes the encrypted packet to outer IP layer 544 for sending to the destination.

SNSL 542 utilizes VARPDB 536 to perform address translation. VARPDB stores all of the address mappings encountered thus far by SNSL 542, including the multicast address mapping for each channel. If SNSL 542 requests a mapping that VARPDB 536 does not have, VARPDB communicates with the VARPD 526 on the local machine to obtain the mapping. VARPD 526 will then contact the VARPD that acts as the server for this particular Supernet to obtain it.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Additionally, although a number of the software components are described as being located on the same machine, one skilled in the art will appreciate that these components may be distributed over a number of machines.

Figure 6A:
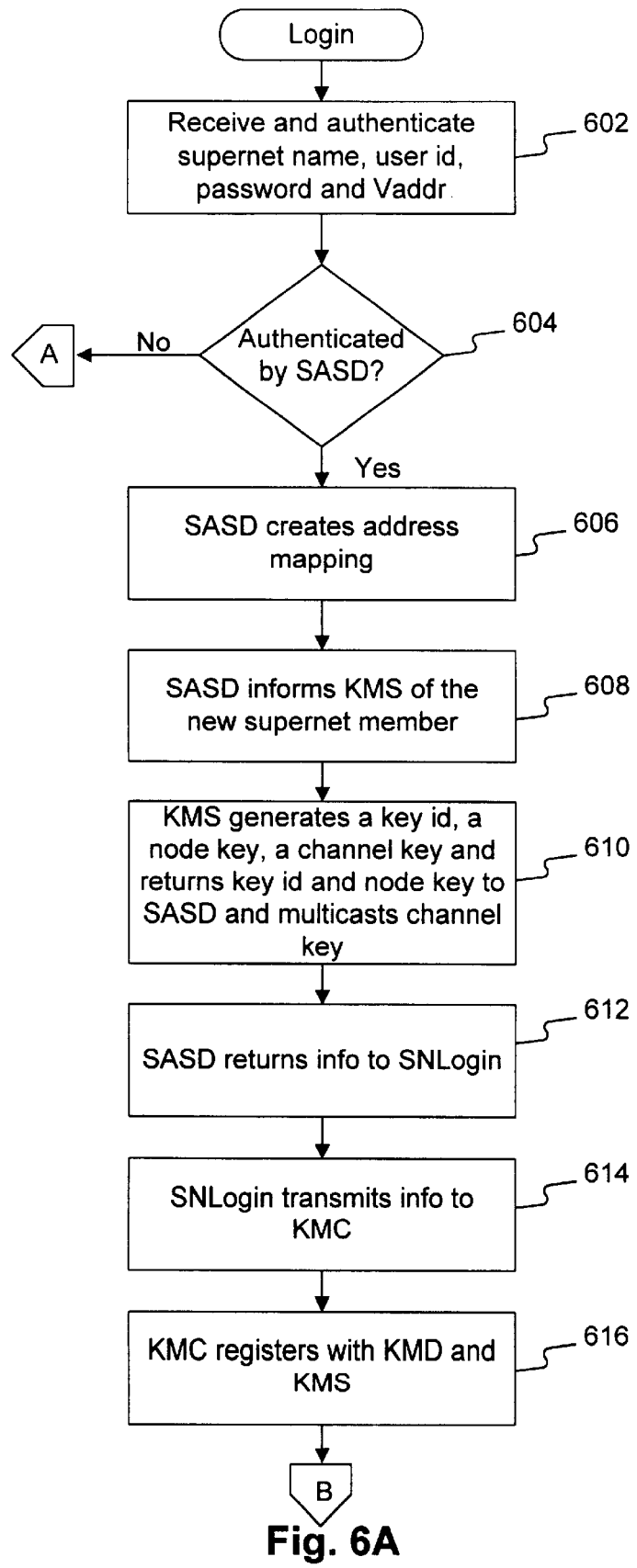
FIGS. 6A and 6B depict a flow chart of the steps performed when a node joins a VPN in a manner consistent with the present invention.
Figure 6B:
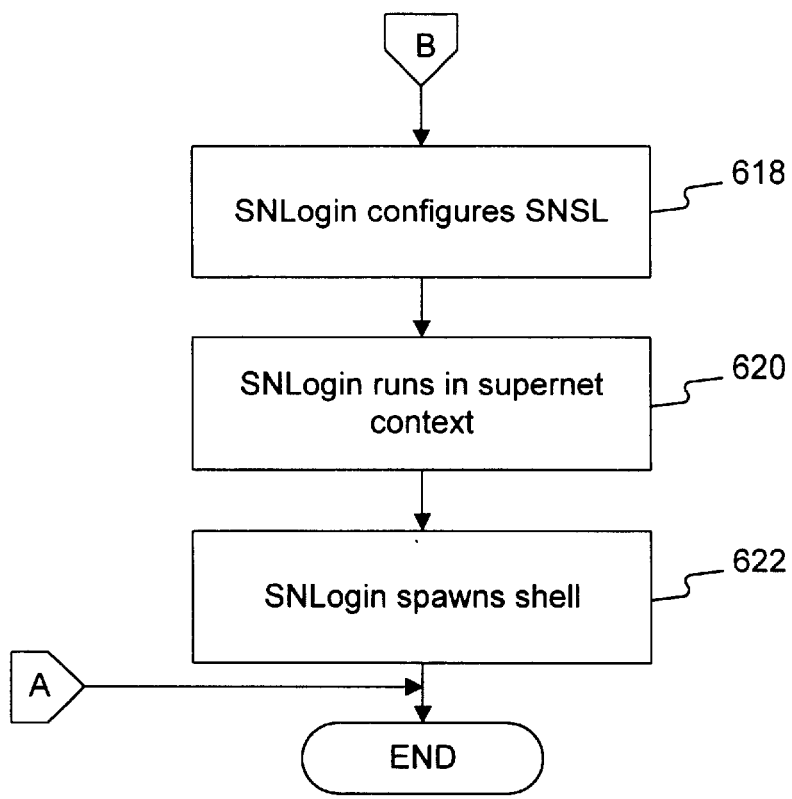

FIGS. 6A and 6B depict a flow chart of the steps performed when a node joins a Supernet. The first step performed is that the user invokes the SNlogin script and enters the Supernet name, their user ID, their password, and a requested virtual address (step 602). Of course, this information depends on the particular authentication mechanism used. Upon receiving this information, the SNlogin script performs a handshaking with SASD to authenticate this information. In this step, the user may request a particular virtual address to be used, or alternatively, the SASD may select one for them. Next, if any of the information in step 602 is not validated by SASD (step 604), processing ends. Otherwise, upon successful authentication, SASD creates an address mapping between a node ID and the real address (step 606). In this step, SASD concatenates the Supernet ID with the virtual address to create the node ID, obtains the real address of the SNlogin script by querying network services in a well-known manner, and then registers this information with the VARPD that acts as the server for this Supernet. This VARPD is identified in the configuration file. Before accepting the address mapping, the VARPD server authenticates the SASD using any of a number of well-known authentication techniques, including Digital Signatures and Kerberos. In this manner, the system ensures that a hacker is not inserting a bogus mapping to violate the integrity of the system.

After creating the address mapping, SASD informs the KMS that there is a new Supernet member that has been authenticated and admitted (step 608). In this step, SASD sends the node ID and the real address to KMS who then generates a key ID, a key for use in communicating between the node's KMC and the KMS ("a node key"), and updates the channel key for use in encrypting traffic on this particular channel (step 610). Additionally, KMS sends the key ID and the node key to SASD and distributes the channel key to all KMCs on the channel as a new key because a node has just been added to the channel. SASD receives the key ID and the node key from KMS and returns it to SNlogin (step 612). After receiving the key ID and the node key from SASD, SNlogin starts a KMC for this node and transmits to the KMC the node ID, the key ID, the node key, the address of the VARPD that acts as the server for this Supernet, and the address of KMS (step 614). The KMC then registers with the KMD indicating the node it is associated with, and KMC registers with KMS for key updates (step 616). When registering with KMS, KMC provides its address so that it can receive updates to the channel key via the Versakey protocol. The Versakey protocol is described in greater detail in *IEEE Journal on Selected Areas in Communication*, Vol. 17, No. 9, 1999, pp. 1614–1631. After registration, the KMC will receive key updates whenever a channel key changes on one of the channels that the node communicates over.

Next, SNlogin configures SNSL (step 618 in FIG. 6B). In this step, SNlogin indicates which encryption algorithm to use for this channel and which authentication algorithm to use, both of which are received from the configuration file via SASD. SNSL stores this information in an access control list. In accordance with methods and systems consistent with present invention, any of a number of well-known encryption algorithms may be used, including the Data Encryption Standard (DES), Triple-DES, the International Data Encryption Algorithm (IDEA), and the Advanced Encryption Standard (AES). Also, RC2, RC4, and RC5 from RSA Incorporated may be used as well as Blowfish from Counterpane.com. Additionally, in accordance with methods and systems consistent with the present invention, any of a number of well-known authentication algorithms may be used, including Digital Signatures, Kerberos, Secure Socket Layer (SSL), and MD5, which is described in RFC1321 of the Internet Engineering Task Force, April, 1992.

After configuring SNSL, SNlogin invokes an operating system call, SETVIN, to cause the SNlogin script to run in a Supernet context (step 620). In Unix, each process has a data structure known as the "proc structure" that contains the process ID as well as a pointer to a virtual memory description of this process. In accordance with methods and systems consistent with the present invention, the channel IDs indicating the channels over which the process communicates as well as its virtual address for this process are added to this structure. By associating this information with the process, the SNSL layer can enforce that this process runs in a Supernet context. Although methods and systems consistent with the present invention are described as operating in a Unix environment, one skilled in the art will appreciate that such methods and systems can operate in other environments. After the SNlogin script runs in the Supernet context, the SNlogin script spawns a Unix program, such as a Unix shell or a service daemon (step 622). In this step, the SNlogin script spawns a Unix shell from which programs can be run by the user. All of these programs will thus run in the Supernet context until the user runs the SNlogout script.

Figure 7:
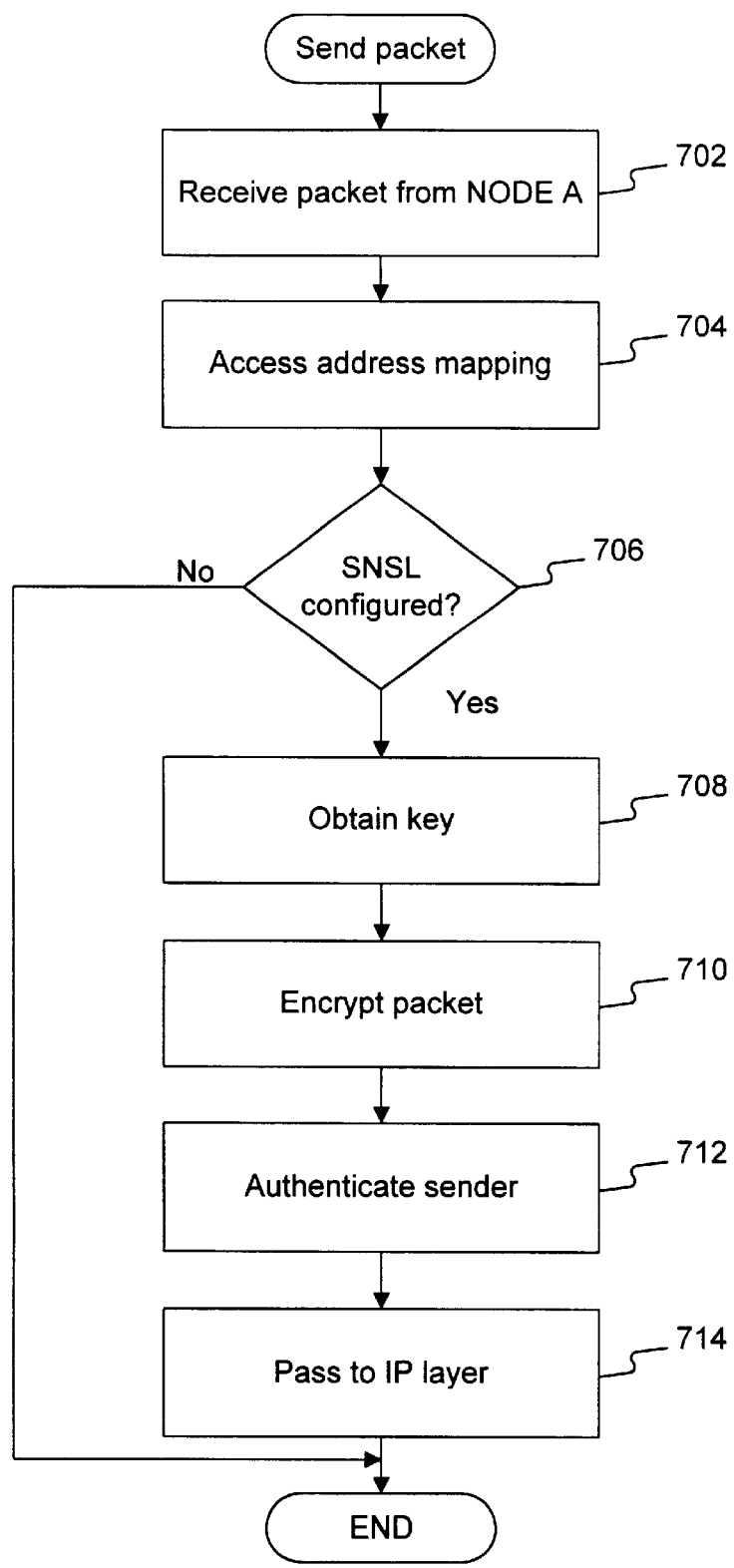
FIG. 7 depicts a flow chart of the steps performed when sending a packet from a node of the VPN in a manner consistent with the present invention.

FIG. 7 depicts a flow chart of the steps performed when sending a packet from node A. Although the steps of the flow chart are described in a particular order, one skilled in the art will appreciate that these steps may be performed in a different order. Additionally, although the SNSL layer is described as performing both authentication and encryption, this processing is policy driven such that either authentication, encryption, both, or neither may be performed. The first step performed is for the SNSL layer to receive a packet originating from node A via the TCP/UDP layer and the inner IP layer (step 702). The packet contains a source node ID, a destination node ID, and data. The SNSL layer then accesses the VARPDB to obtain the address mapping between the source node ID and the source real address as well as the destination node ID and the destination real address (step 704). If they are not contained in the VARPDB because this is the first time a packet has been sent from this node or sent to this destination, the VARPDB accesses the local VARPD to obtain the mapping. When contacted, the VARPD on the local machine contacts the VARPD that acts as the server for the Supernet to obtain the appropriate address mapping.

After obtaining the address mapping, the SNSL layer determines whether it has been configured to communicate over the appropriate channel for this packet (step 706). This configuration occurs when SNlogin runs, and if the SNSL has not been so configured, processing ends. Otherwise, SNSL obtains the channel key to be used for this channel (step 708). The SNSL maintains a local cache of keys and an indication of the channel to which each key is associated. Each channel key is time stamped to expire in ten seconds, although this time is configurable by the administrator. If there is a key located in the cache for this channel, SNSL obtains the key. Otherwise, SNSL accesses KMD which then locates the appropriate channel key from the appropriate KMC. After obtaining the key, the SNSL layer encrypts the packet using the appropriate encryption algorithm and the key previously obtained (step 710). When encrypting the packet, the source node ID, the destination node ID, and the data may be encrypted, but the source and destination real addresses are not, so that the real addresses can be used by the public network infrastructure to send the packet to its destination.

After encrypting the packet, the SNSL layer authenticates the sender to verify that it is the bona fide sender and that the packet was not modified in transit (step 712). In this step, the SNSL layer uses the MD5 authentication protocol, although one skilled in the art will appreciate that other authentication protocols may be used. Next, the SNSL layer passes the packet to the IP layer where it is then sent to the destination node in accordance with known techniques associated with the IP protocol (step 714).

Figure 8:
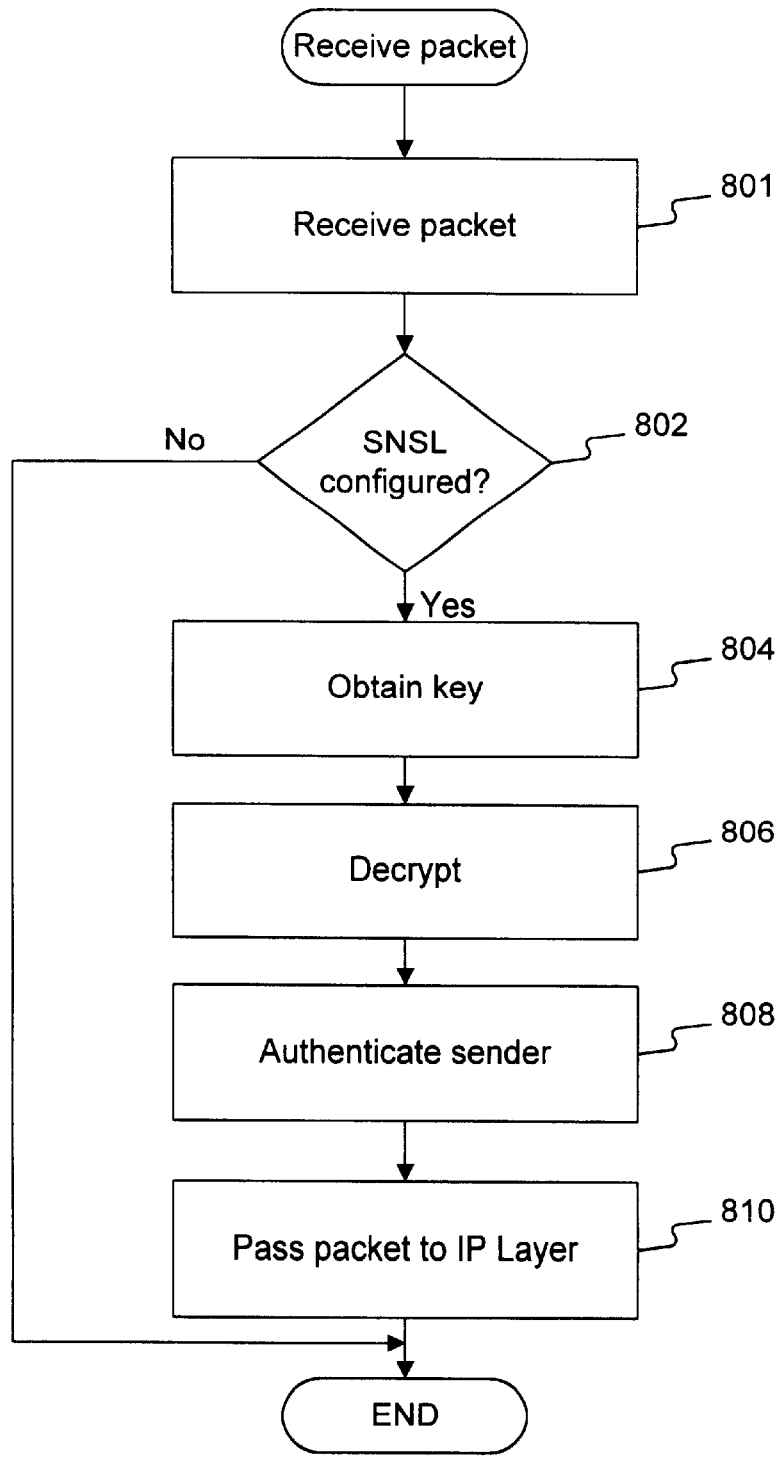
FIG. 8 depicts a flow chart of the steps performed when receiving a packet by a node of the VPN in a manner consistent with the present invention.

FIG. 8 depicts a flow chart of the steps performed by the SNSL layer when it receives a packet. Although the steps of the flow chart are described in a particular order, one skilled in the art will appreciate that these steps may be performed in a different order. Additionally, although the SNSL layer is described as performing both authentication and encryption, this processing is policy driven such that either authentication, encryption, both, or neither may be performed. The first step performed by the SNSL layer is to receive a packet from the network (step 801). This packet contains a real source address and a real destination address that are not encrypted as well as a source node ID, a destination node ID, and data that are encrypted. Then, it determines whether it has been configured to communicate on this channel to the destination node (step 802). If SNSL has not been so configured, processing ends. Otherwise, the SNSL layer obtains the appropriate key as previously described (step 804). It then decrypts the packet using this key and the appropriate encryption algorithm (step 806). After decrypting the packet, the SNSL layer authenticates the sender and validates the integrity of the packet (step 808), and then it passes the packet to the inner IP layer for delivery to the appropriate node (step 810). Upon receiving the packet, the inner IP layer uses the destination node ID to deliver the packet.

Figure 9:
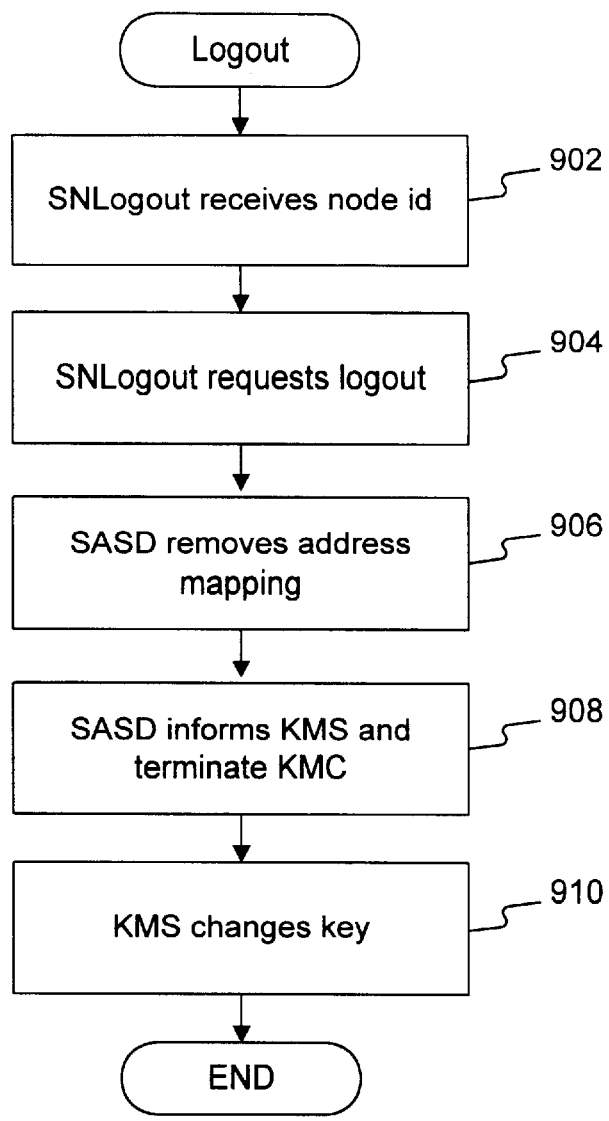
FIG. 9 depicts a flow chart of the steps performed when logging out of a VPN in a manner consistent with the present invention.

FIG. 9 depicts a flow chart of the steps performed when logging a node out of a Supernet. The first step performed is for the user to run the SNlogout script and to enter a node ID (step 902). Next, the SNlogout script requests a log out from SASD (step 904). Upon receiving this request, SASD removes the mapping for this node from the VARPD that acts as the server for the Supernet (step 906). SASD then informs KMS to cancel the registration of the node, and KMS terminates this KMC (step 908). Lastly, KMS generates a new channel key for the channels on which the node was communicating (step 910) to provide greater security.

Figure 10:
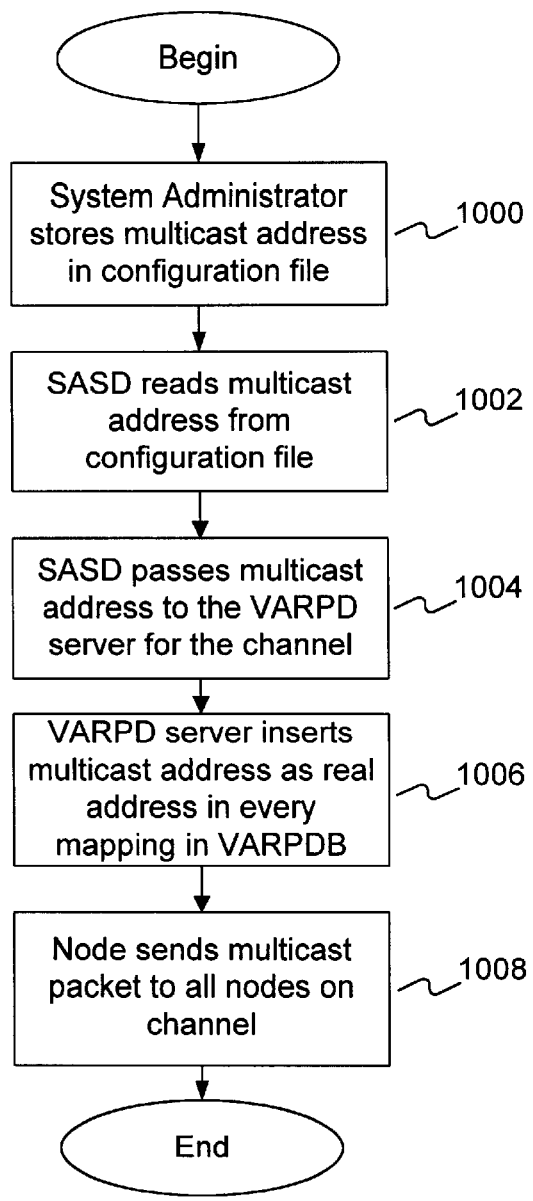
FIG. 10 depicts a flow chart of the steps performed when multicasting on a channel in the VPN in a manner consistent with the present invention.

FIG. 10 depicts a flow chart of the steps performed when multicasting on a channel in the Supernet. When establishing or reconfiguring the Supernet, the system administrator stores a multicast address for each channel in the configuration file (step 1000). When the SASD is started, it reads the multicast addresses from the configuration file (step 1002). The SASD passes an address to the VARPD server for the channel (step 1004). The VARPD server inserts into the VARPDB the multicast address as the real address in the mapping for every node on the channel (step 1006). Next, one of the nodes on the channel sends a packet to a destination node by passing it to the protocol stack (step 1008). In this step, the SNSL layer requests a mapping for the destination node and receives one that indicates the multicast address because this channel uses multicast addressing. The SNSL layer then sends the packet to this multicast address which causes it to be delivered to all of the nodes on the channel.

Figure 11A:
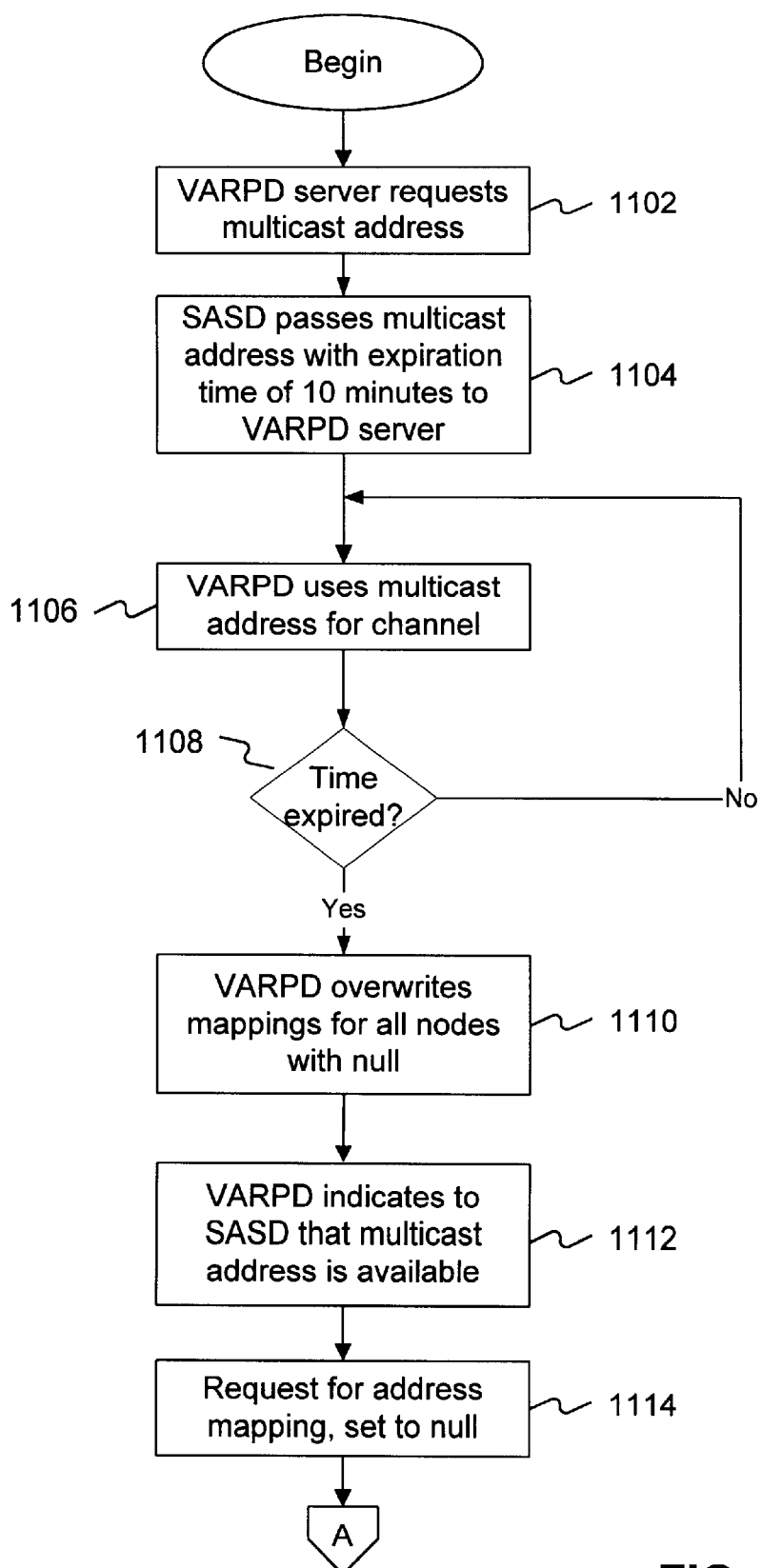
FIG. 11A and 11B depict how multicast addresses can be dynamically allocated in the VPN in a manner consistent with the present invention.
Figure 11B:
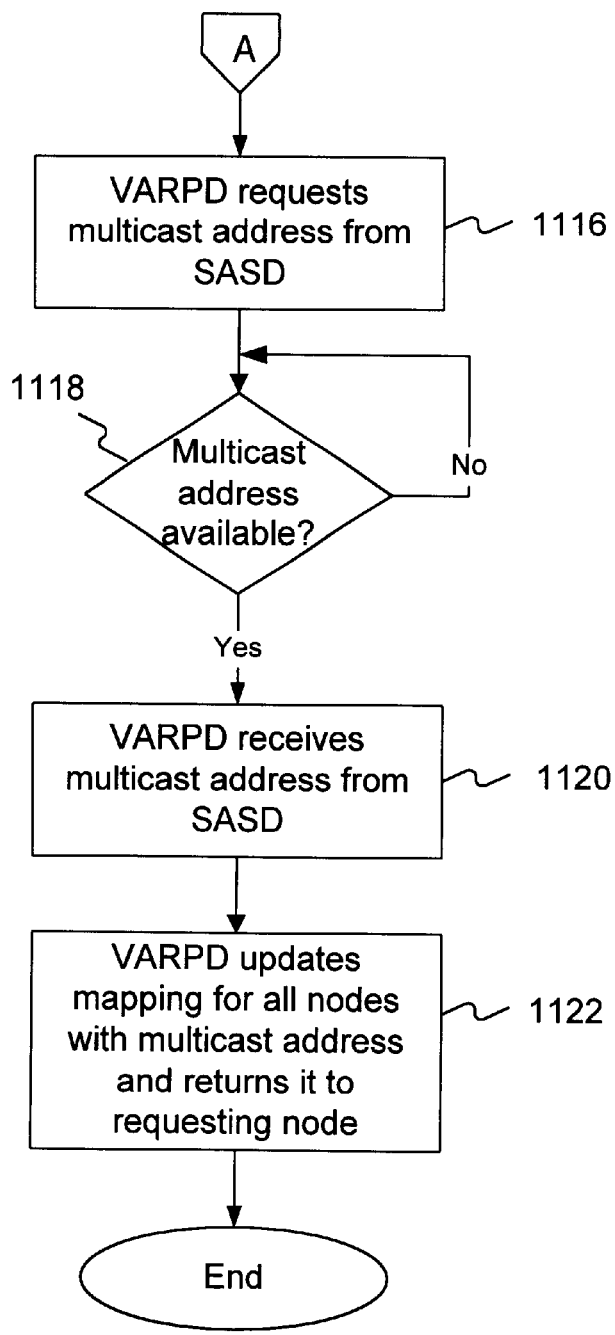

Alternatively, FIGS. 11A and 11B depict how the multicast addresses can be dynamically allocated. In this embodiment, the SASD maintains a list of available multicast addresses, and each address mapping for a multicast channel has an expiration time of 10 minutes, which is configurable. Initially, the VARPD server requests a multicast address to use for its channel (step 1102). Responsive to this request, the SASD returns a multicast address to the VARPD server (step 1104). Upon receiving the multicast address, the VARPD server updates the address mappings for each of the nodes on the channel to use this multicast address as its real address (step 1106). Next, the VARPD server detects if the expiration time has expired (step 1108). If not, the VARPD server may continue to use the multicast address. If it has expired, the VARPD server overwrites the mappings for all nodes in the channel with null (step 1110) and indicates to the SASD that the multicast address is available for use by another channel (step 1112).

After relinquishing the multicast address, if one of the address mappings on this channel is requested that has a null real address (step 1114), the VARPD server will request a multicast address from the SASD (step 1116 in FIG. 11B). If an address is unavailable, the VARPD server will wait. Otherwise, if one is available, the VARPD server receives the multicast address from the SASD (step 1120), updates all of the mappings for the nodes on the channel with this address, and returns it to the requesting node (step 1122).

Although the present invention has been described with reference to a preferred embodiment, those skilled in the art will know of various changes in form and detail which may be made without departing from the spirit and scope of the present invention as defined in the appended claims and their full scope of equivalents.

What is claimed is:

1. A method in a data processing system for providing communication in a network with a plurality of channels, each of the channels with a plurality of nodes having an address stored in an address resolution component, the method comprising the steps of:

assigning, by a secured access program, a multicast address to the plurality of nodes on one of the channels by transmitting the multicast address to the address resolution component;

authenticating, by the address resolution component, the secured access program;

responsive to successfully authenticating the secured access program, updating, by the address resolution component, the address of each node on the one channel to include the multicast address;

sending a packet to the multicast address such that only the plurality of nodes on the one channel receive the packet; and deassigning the multicast address from the one channel such that the multicast address is rendered unavailable to the nodes on the one channel.

2. The method of claim 1 wherein the assigning step further comprises reading the multicast address from a configuration file.

3. The method of claim 1 wherein the assigning step further comprises the step of:

designating an expiration time for the multicast address; and wherein the deassigning step further comprises the step of:

determining that the expiration time has lapsed.

4. The method of claim 1 wherein the network is a private network running on a public network infrastructure.

5. A method in a distributed system having a public network infrastructure, the method comprising the steps of:

establishing a private network with a plurality of nodes over the public network infrastructure, wherein each node has an address stored in an address resolution component in the private network;

assigning, by a secured access program in the Private network, a multicast address to a channel containing fewer than all of the nodes on the private network by transmitting the multicast address to the address resolution component;

authenticating, by the address resolution component, the secured access program;

responsive to successfully authenticating the secured access program, updating, by the address resolution component, an address of each node on the channel to include the multicast address;

sending a multicast communication to the channel containing fewer than all of the nodes on the private network using the multicast address assigned to the channel on the private network; and deassigning the multicast address from the channel on the private network, thereby making the multicast address unavailable to the nodes in the channel on the private network.

6. The method of claim 5 further including the step of:

assigning the multicast address to another channel containing fewer than all of the plurality of nodes on the network.

7. A distributed system comprising a private network with a plurality of nodes on devices, the private network using a public network infrastructure, comprising:

a first of the devices comprising:
a memory with a secured access program that assigns a multicast address with an expiration time to a channel containing fewer than all of the plurality of nodes by transmitting the multicast address to an address manager, and that deassigns the multicast address such that the multicast address is rendered unavailable to the channel when the expiration time expires; and
a processor that runs the secured access program;

a second of the devices comprising:
a memory with an address manager that receives the multicast address, authenticates the secured access program, and updates an address of each node on the channel to include the multicast address; and
a processor that runs the address manager; and a third device comprising:
a memory with a sending one of the nodes on the channel that requests from the address manager an address for a destination one of the nodes on the channel, that receives from the address manager the multicast address, and that sends a packet to the multicast address such that only the plurality of nodes on the channel receives the packet; and
a processor that runs the sending node.

8. A method in a data processing system for providing communication in a network with a plurality of channels, each of the channels with a plurality of nodes, wherein each node has an address stored in an address resolution component, the method comprising the steps of:

assigning, by a secured access program, a multicast address to the plurality of nodes on one of the channels by transmitting the multicast address to the address resolution component;

authenticating the secured access program, by the address resolution component;

responsive to successfully authenticating the secured access program, updating the addresses in the address resolution component to include the multicast address for each of the plurality of nodes on the one channel by the address resolution component;

attempting to send a packet from a sending one of the plurality of nodes on the one channel to a destination one of the plurality of nodes on the one channel by passing the packet to a protocol stack;

accessing the multicast address in the address resolution component by the protocol stack;

using the multicast address to transmit the packet to the plurality of nodes on the one channel such that the packet is not transmitted to nodes in the network that are not on the one channel; and deassigning the multicast address from the one channel by the address resolution component such that the multicast address is rendered unavailable to the plurality of nodes on the one channel.

9. The method of claim 8 wherein the assigning step further comprises the step of:

designating an expiration time for the multicast address; and wherein the deassigning step further comprises the step of:

determining that the expiration time has expired.

10. The method of claim 8, wherein the method further includes the step of:

assigning the multicast address to the plurality of nodes on another one of the channels.

11. A data processing system for providing a distributed system in a public network infrastructure, the data processing system comprising:

means for establishing a private network with a plurality of nodes over the public network infrastructure, wherein each node has an address stored in an address resolution component in the private network;

means for assigning, by a secured access program in the private network, a multicast address to a channel containing fewer than all of the nodes on the private network by transmitting the multicast address to the address resolution component;

means for authenticating, by the address resolution component, the secured access program;

means for updating by the address resolution component, responsive to successfully authenticating the secured access program, an address of each node on the channel to include the multicast address;

means for sending a multicast communication to the channel containing fewer than all of the nodes on the private network using the multicast address assigned to the channel on the private network; and means for deassigning the multicast address from the channel on the private network, thereby making the multicast address unavailable to the nodes in the channel on the private network.

12. A computer-readable medium containing instructions for controlling a data processing system to perform a method, the method in a distributed system having a public network infrastructure, the method comprising the steps of:

establishing a private network with a plurality of nodes over the public network infrastructure, wherein each node has an address stored in an address resolution component in the private network;

assigning, by a secured access program in the private network, a multicast address to a channel containing fewer than all of the nodes on the private network by transmitting the multicast address to the address resolution component, authenticating, by the address resolution component, the secured access program;

responsive to successfully authenticating the secured access program, updating, by the address resolution component, an address of each node on the channel to include the multicast address;

sending a multicast communication to the channel containing fewer than all of the nodes on the private network using the multicast address assigned to the channel on the private network; and deassigning the multicast address from the channel on the private network, thereby making the multicast address unavailable to the nodes in the channel on the private network.

13. The computer-readable medium of claim 12, the method further including the step of:

assigning the multicast address to another channel containing fewer than all of nodes on the network.

14. A computer-readable medium containing instructions for controlling a data processing system to perform a method, the method in a data processing system for providing communication in a network with a plurality of channels, each of the channels with a plurality of nodes, wherein each node has an address stored in an address resolution component, the method comprising the steps of:

assigning, by a secured access program, a multicast address to the plurality of nodes on one of the channels by transmitting the multicast address to the address resolution component;

authenticating, by the address resolution component, the secured access program;

responsive to successfully authenticating the secured access program, updating, by the address resolution component, the address of each node on the one channel to include the multicast address;

sending a packet to the multicast address such that the plurality of nodes on the one channel receive the packet and nodes in the network that are not on the one channel do not receive the packet; and deassigning the multicast address from the one channel such that the multicast address is rendered unavailable to the nodes on the one channel.

15. The computer-readable medium of claim 14 wherein the assigning step further comprises the step of:

reading the multicast address from a configuration file.

16. The computer-readable medium of claim 14 wherein the assigning step further comprises the step of:

designating an expiration time for the multicast address; and wherein the deassigning step further comprises the step of:

determining that the expiration time has lapsed.

17. The computer-readable medium of claim herein the network is a private network running on a public network infrastructure.

* * * * *

UNITED STATES PATENT AND TRADEMARK OFFICE
CERTIFICATE OF CORRECTION

PATENT NO. : 6,870,842 B1
DATED : March 22, 2005
INVENTOR(S) : Germano Caronni et al.

It is certified that error appears in the above-identified patent and that said Letters Patent is hereby corrected as shown below:

Column 12,
Line 60, after "comprises", insert -- the step of --.

Column 13,
Line 9, "Private" should read -- private --.

Column 15,
Line 2, "component," should read -- component; --.

Column 16,
Line 25, "claim herein" should read -- claim 14 wherein --.

Signed and Sealed this

Twenty-eighth Day of June, 2005

JON W. DUDAS
*Director of the United States Patent and Trademark Office*